United States Patent
Shniberg et al.

(10) Patent No.: US 6,922,208 B2
(45) Date of Patent: *Jul. 26, 2005

(54) METHOD FOR AUTOMATIC IDENTIFICATION AND DATA CAPTURE

(75) Inventors: Moti Shniberg, Elkannah (IL); Yaron Nemet, Kedumim (IL); Erez Sali, Savion (IL)

(73) Assignee: Imageid Ltd., Rosh Ha'Ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/849,026

(22) Filed: May 20, 2004

(65) Prior Publication Data

US 2004/0212501 A1 Oct. 28, 2004

Related U.S. Application Data

(63) Continuation of application No. 10/052,427, filed on Jan. 18, 2002, now Pat. No. 6,801,245.

(51) Int. Cl.[7] .............................................. H04N 5/225
(52) U.S. Cl. ....................... 348/169; 235/385; 235/469; 235/494; 340/5.92
(58) Field of Search ............................. 348/86, 91, 94, 348/96, 161, 169, 195; 340/5.92, 572.1, 572.4, 521, 522, 573.1, 691.6; 705/22, 28; 235/385, 487, 494, 454, 469, 462.01; 250/555, 559.07, 559.08; 382/181, 224, 100, 141, 103

(56) References Cited

U.S. PATENT DOCUMENTS

| | | | | | |
|---|---|---|---|---|---|
| 5,698,833 | A | * | 12/1997 | Skinger | 235/462.09 |
| 6,142,375 | A | * | 11/2000 | Belka et al. | 235/454 |
| 6,286,763 | B1 | * | 9/2001 | Reynolds et al. | 235/472.01 |
| 6,526,158 | B1 | * | 2/2003 | Goldberg | 382/115 |
| 6,801,245 | B2 | * | 10/2004 | Shniberg et al. | 348/169 |

* cited by examiner

*Primary Examiner*—Thomas Mullen
(74) *Attorney, Agent, or Firm*—AlphaPatent Associates Ltd.; Daniel J. Swirsky

(57) ABSTRACT

A methodology for tracking objects includes receiving a multiplicity of objects to be tracked at a known location. Each multiplicity of objects has at least one imagable identifier affixed to it. The method also includes imaging the multiplicity of objects together at the known location to provide at least a partial image of the multiplicity of objects. The method also includes employing the partial image to determine an identification code for a plurality of the multiplicity of objects, as well as associating each identification code with a known location code.

41 Claims, 4 Drawing Sheets

METHOD FOR AUTOMATIC IDENTIFICATION AND DATA CAPTURE

CROSS-REFERENCE TO RELATED APPLICATIONS

This application is a continuation application of U.S. patent application Ser. No. 10/052,427 filed Jan. 18, 2002, now U.S. Pat. No. 6,801,245 which is incorporated herein by reference.

FIELD OF THE INVENTION

The present invention relates to logistics systems and methodologies generally.

BACKGROUND OF THE INVENTION

The following patents and patent applications are believed to represent the current state of the art relevant to the present invention:

U.S. Pat. Nos. 4,044,227; 4,268,179; 4,794,238; 4,844,509; 5,468,949; 5,600,121; 5,621,864; 5,825,012; 5,828,048; 5,828,049; 5,988,508; 5,996,895; 6,070,801; 6,127,928, 6,206,286; 6,252,508; 6259,408; 6,265,977; 6,283,375; 6,285,342, 6,286,763, 6,317,044.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
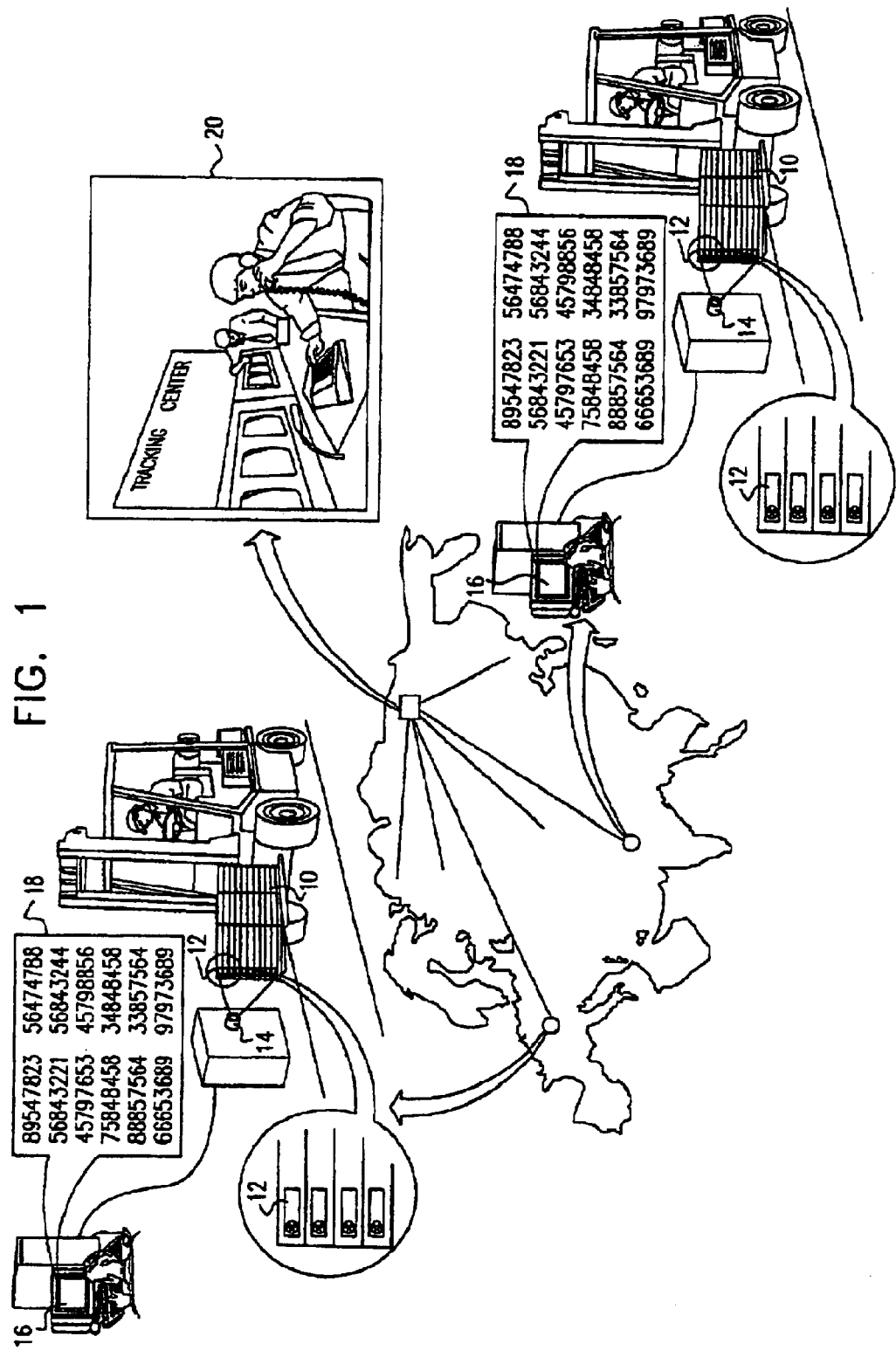
FIG. 1 is a simplified illustration of a multiple location object tracing and tracking system constructed and operative in accordance with a preferred embodiment of the present invention.

Reference is now made to FIG. 1, which is a simplified illustration of a multiple location object tracing and tracking system constructed and operative in accordance with a preferred embodiment of the present invention.

As seen in FIG. 1, there is preferably provided a tracing and tracking system which covers multiple geographically disparate locations at which it is sought to trace and track objects. At typical such locations, such as warehouses, a plurality of objects, such as stacked, collapsed containers 10, each bear an imagable identifier 12. The imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode The identifier is described in the following references, the disclosures of which are hereby incorporated by reference:

U.S. patent application Ser. No. 09/508,300

Published PCT Patent Application WO 00/04711.

It is a particular feature of the present invention that the imagable identifiers on a plurality of objects may be imaged together, as in a single photograph, by a conventional imager 14, such as a digital camera. This is principally due to the fact that the various colors appear in the imagable identifier in two dimensional areas which are relatively easily differentiated from each other both spatially and in color space.

The image output of the imager is preferably provided to a computer 16, which may process the image output locally and provide an output indication 18 representing a plurality of numerical or alphanumerical identifiers corresponding to all of the imagable identifiers imaged in a given image or series of images. Alternatively or additionally, computer 16 may communicate via any suitable computer network, such as the Internet, with a remote tracking center 20, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 16 or in remote tracking center 20.

The remote tracking center 20 preferably compiles records of tracked numerical or alphanumerical identifiers from a multiplicity of geographically disparate locations so as to enable ready counting, tracking and locating of objects identified thereby. Remote tracking center 20 preferably maintains a database which is updated based on communications received from various geographically disparate locations.

Figure 2:
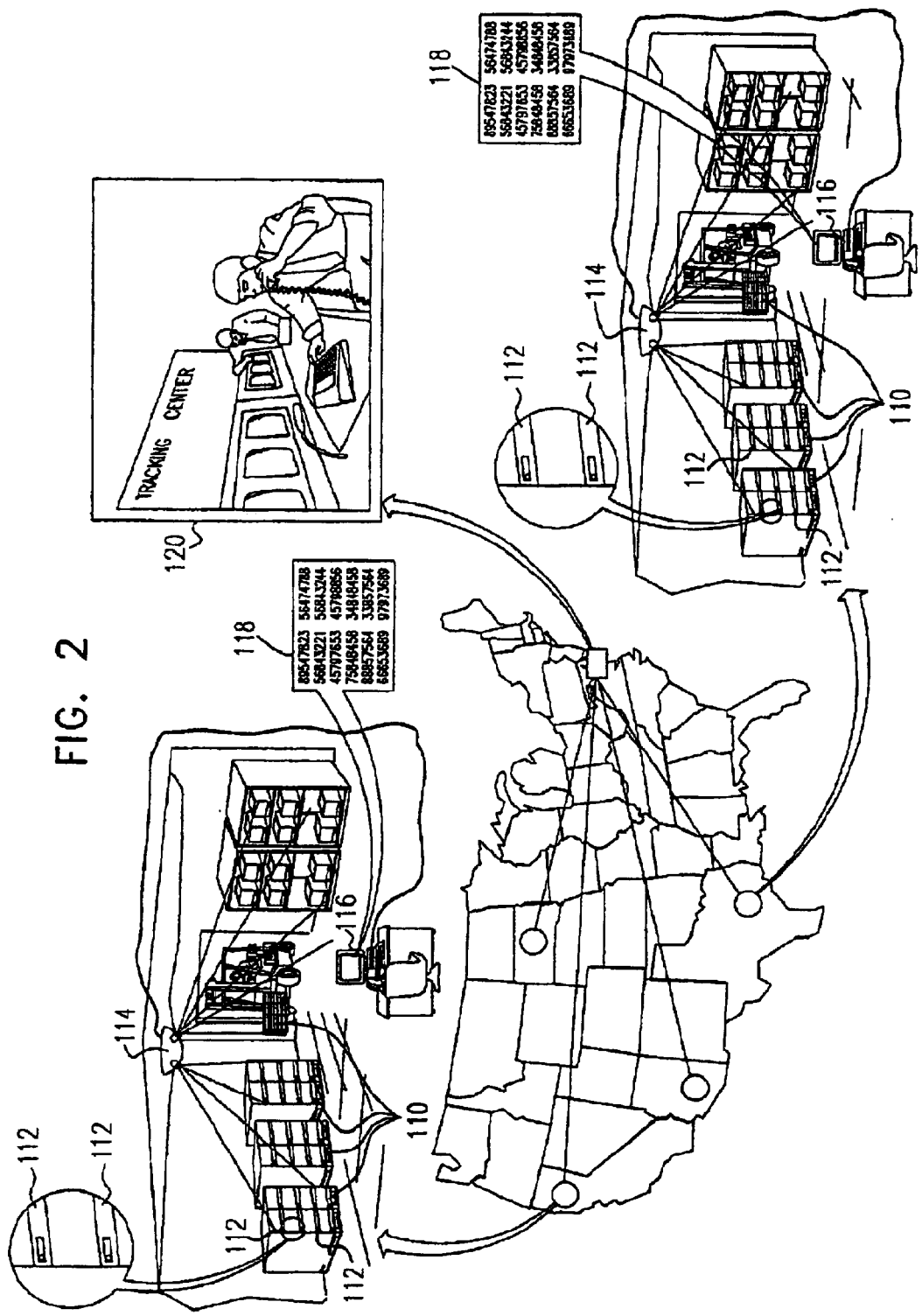
FIG. 2 is a simplified illustration of a multiple location object tracing and tracking system constructed and operative in accordance with another preferred embodiment of the present invention.

Reference is now made to FIG. 2, which is a simplified illustration of a multiple location object tracing and tracking system constructed and operative in accordance with another preferred embodiment of the present invention. As seen in FIG. 2, there is preferably provided a tracing and tracking system which covers multiple geographically disparate locations at which it is sought to trace and track objects. At typical such locations, such as warehouses, a plurality of objects, such as multiple stacks of containers 110 or objects stored on shelves, each bear an imagable identifier 112. The imagable identifier preferably comprises a multi-segment, multi-color identifier preferably in the form of a multi-segment color-coded disc wherein various segments have various colors A preferred imagable identifier is commercially available from ImageID Inc. of One Penn Plaza, Suite 2210, New York, N.Y., U.S.A. under the trade name Imagecode The identifier is described in the following references, the disclosures of which are hereby incorporated by reference:

U.S. patent application Ser. No. 09/508,300

Published PCT Patent Application WO 00/04711.

It is a particular feature of the present invention that the imagable identifiers on a plurality of objects may be automatically imaged together, as in a single photograph or a series of photographs, by a conventional imager 114, such as a panoramic digital camera. This is principally due to the fact that the various colors appear in the imagable identifier in two dimensional areas which are relatively easily differentiated from each other both spatially and in color space.

The arrangement of FIG. 2 is particularly useful for continuously updating inventory records of a large number of objects automatically, without the necessity of approaching each object or stack of objects or moving the objects past a tracking station The image output of the imager is preferably provided to a computer 116 which may process the image output locally and provide an output indication 118 representing a plurality of numerical or alphanumerical identifiers corresponding to all of the imagable identifiers imaged in a given image or series of images. Alternatively or additionally, computer 116 may communicate via any suitable computer network, such as the Internet, with a remote tracking center 120, which may receive either image outputs for processing or alternatively may receive the plurality of numerical or alphanumerical identifiers corresponding to all of the imagable identifiers imaged in a given image or series of images. The image outputs may also be stored for fixture retrieval, either locally in computer 116 or in remote tracking center 120.

The remote tracking center 120 preferably compiles records of tracked numerical or alphanumerical identifiers from a multiplicity of geographically disparate locations so as to enable ready counting, tracking and locating of objects identified thereby. Remote tracking center 120 preferably maintains a database which is updated based on communications received from various geographically disparate locations.

Figure 3:
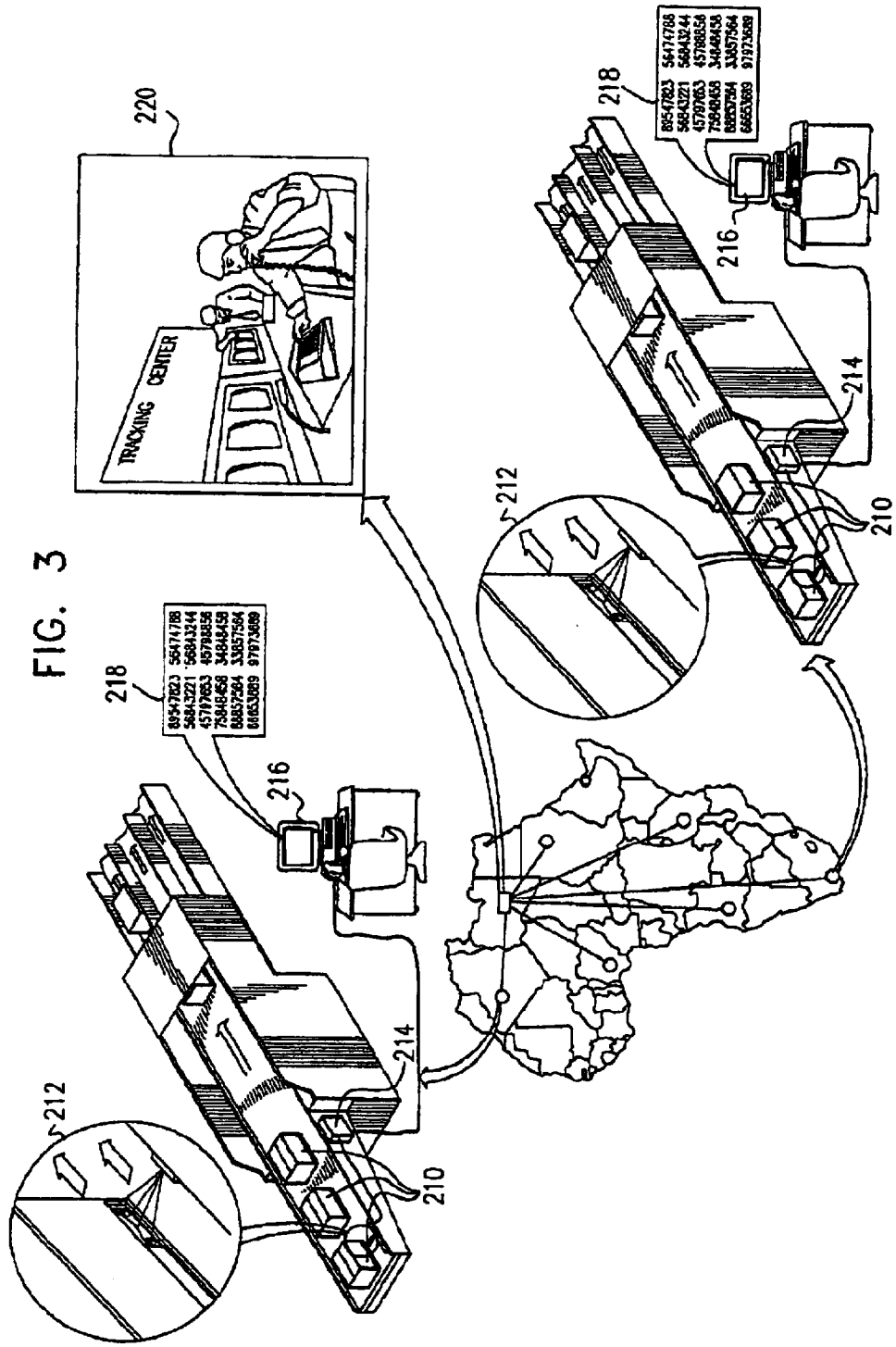
FIG. 3 is a simplified illustration of a multiple location object tracing and tracking system constructed and operative in accordance with yet another preferred embodiment of the present invention.

Reference is now made to FIG. 3, which is a simplified illustration of a multiple location object tracing and tracking system constructed and operative in accordance with yet another preferred embodiment of the present invention. As seen in FIG. 3, there is preferably provided a tracing and tracking system which covers multiple geographically disparate locations at which it is sought to trace and track objects. At typical such locations, such as warehouses, a plurality of objects, such as multiple containers 210, each bear a plurality of imagable identifiers 212. Each imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode. The identifier is described in the following references, the disclosures of which are hereby incorporated by reference:

U.S. patent application Ser. No. 09/508,300

Published PCT Patent Application WO 00/04711.

It is a particular feature of the present invention that multiple imagable identifiers on one or more objects may be automatically imaged together, as in a single photograph or a series of photographs, by a conventional imager 214, such as a digital camera. This is principally due to the fact that the various colors appear in the imagable identifier in two dimensional areas which are relatively easily differentiated from each other both spatially and in color space.

The arrangement of FIG. 3 is particularly useful for providing a relatively large number of available numerical or alphanumerical identifiers. For example, use of a single Imagecode.™. imagable identifier typically provides approximately 60,000 combinations. The use of two Imagecode.™. imagable identifiers in a predetermined relative spatial orientation may provide approximately 60,000.times.60,000 combinations.

The image output of the imager is preferably provided to a computer 216, which may process the image output locally and provide an output indication 218 representing a plurality of numerical or alphanumerical identifiers corresponding to all of the pluralities of imagable identifiers imaged in a given image or series of images. Alternatively or additionally, computer 216 may communicate via any suitable computer network, such as the Internet, with a remote tracking center 220, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 216 or in remote tracking center 220.

The remote tracking center 220 preferably compiles records of tracked numerical or alphanumerical identifiers from a multiplicity of geographically disparate locations so as to enable ready counting, tracking and locating of objects identified thereby Remote tracking center 220 preferably maintains a database which is updated based on communications received from various geographically disparate locations.

In accordance with a preferred embodiment of the present invention, the multi-segment, multi-color identifier 12, 112 and 212 is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

The foregoing calculation does not assume any predetermined orientation of the imagable identifier.

More preferably, the multi-segment, multi-color identifier is capable of identifying and distinguishing a plurality of objects at least equal to approximately:

$$\text{Plurality of objects} = (n \times (n-1)^{(p-2)} \times (n-2))$$

where n is the number of different colors and p is the number of segments.

This calculation assumes a known or constant orientation of the imagable identifier.

Figure 4:
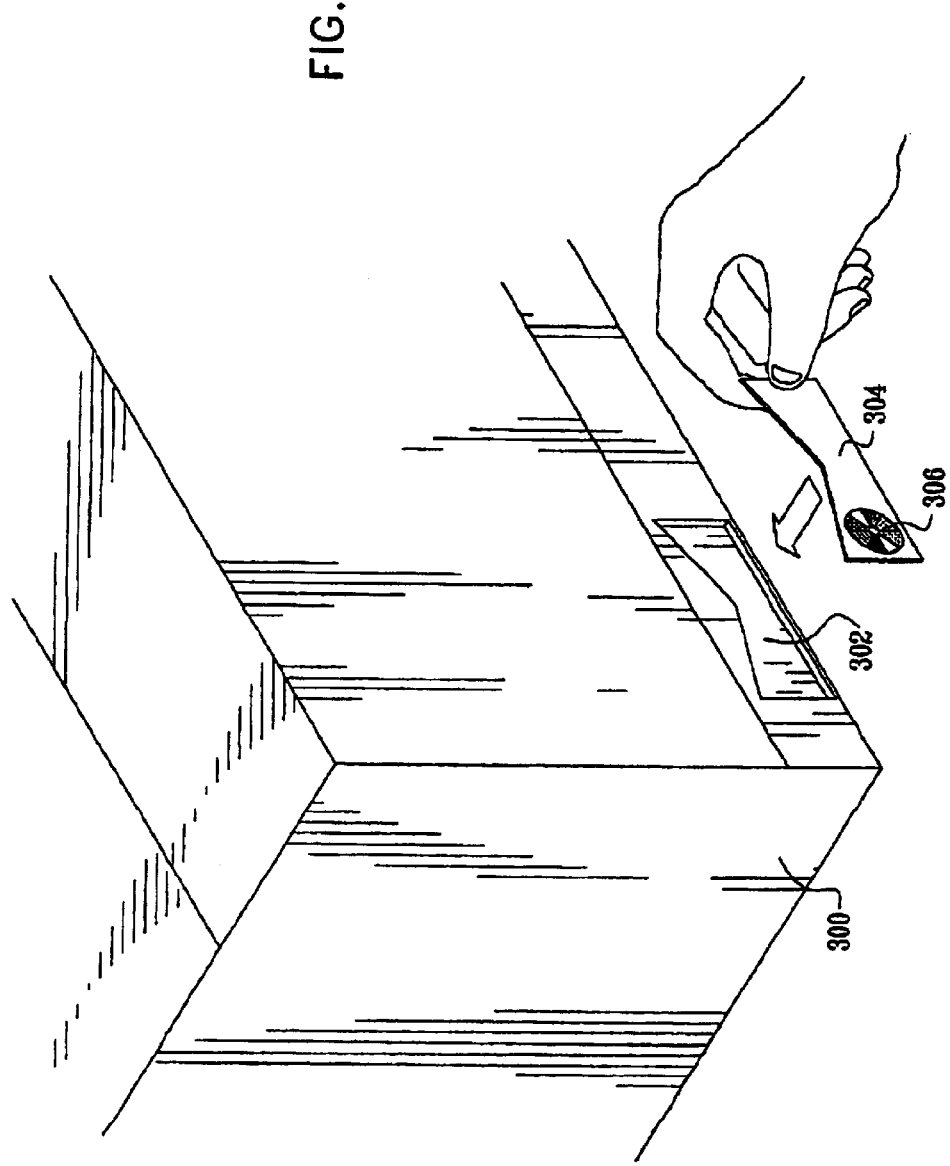
FIG. 4 is an illustration of a methodology for correct affixation of an imagable identifier to an object.

In accordance with a preferred embodiment of the invention, the multi-segment, multi-color identifier has an inherent orientation. It is appreciated that this need not necessarily be the case When the multi-segment, multi-color identifier does not have an inherent orientation, the methodology exemplified in FIG. 4 is particularly useful Reference is now made to FIG. 4, which is an illustration of a methodology for correct affixation of an imagable identifier to an object. It is appreciated that due to the circular symmetry of the Imagecode.™. imagable identifier, consistency of affixation orientation is important in order to maximize the number of available combinations of numerical or alphanumerical identifiers while avoiding misidentification of objects.

One technique for ensuring correct affixation orientation is to mold or otherwise form onto a container 300, a three-dimensionally defined affixation location 302 and to provide an imagable identifier carrier 304, such as an adhesive backed sticker, which has a configuration, such as a notched configuration, which allows it to be placed in the three-dimensionally defined affixation location 302 only in one unique orientation relative to the container. Clearly, the structure and methodology shown in FIG. 4 is applicable to imagable identifier carriers 304 which bear multiple as well as single imagable identifiers 306. It is appreciated that other suitable techniques of unique orientation affixation may be employed, such as printing or molding of an imagable identifier directly onto an object.

It is noted that for the sake of clarity, the features of FIGS. 1, 2, 3 and 4 have been described separately. It is to be appreciated that the features of any one or all of FIGS. 1, 2, 3 and 4 may be advantageously combined in a given system or methodology It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

What is claimed is:

1. A methodology for tracking objects comprising: receiving a multiplicity of objects to be tracked at a known location, each of said multiplicity of objects having at least one imagable identifier affixed thereto; imaging said multiplicity of objects together at said known location to provide an at least partial image of said multiplicity of objects; employing said at least partial image to determine an identification code for at least a plurality of said multiplicity of objects; and associating each identification code with a known location code.

2. The methodology as in claim 1 further comprising communicating said at least partial image and its associated identification and location codes to a remote location.

3. The methodology as in claim 1 and also comprising storing said at least partial image and its associated identification and location codes.

4. The methodology as in claim 1 wherein said imaging is color imaging.

5. The methodology as in claim 1 wherein said at least one imagable identifier comprises a multi-color identifier.

6. The methodology as in claim 1 wherein said at least one imagable identifier comprises a multi-segment, multi-color identifier.

7. The methodology as in claim 6 wherein said identifier has an inherent orientation.

8. The methodology as in claim 1 wherein said imaging comprises sequentially imaging different pluralities of objects passing a given imaging location.

9. The methodology as in claim 1 wherein said at least one imagable identifier comprises a plurality of imagable identifiers arranged in at least predetermined propinquity to each other.

10. The methodology as in claim 1 wherein said employing comprises extracting said identification code from said at least partial image.

11. The methodology as in claim 1 wherein said identifier has an inherent orientation.

12. The methodology for tracking objects as defined in claim 1 in which said known location code is a code for said known location.

13. An object tracking system comprising: an imager to image together at a known location a multiplicity of objects to be tracked, each one of said objects having at least one imagable identifier affixed thereto, and to provide an at least partial image of said multiplicity of said objects, said image including at least each of said at least one imagable identifiers; a processor employing said at least partial image to determine an identification code for a plurality of said multiplicity of objects and to associate each identification code with a known location code.

14. The system as in claim 13 further comprising a communication unit to communicate said at least partial image and its associated identification and location codes to a remote location.

15. The system as in claim 13 wherein said at least one imagable identifier comprises a multi-color identifier.

16. The system as in claim 13 wherein said at least one imagable identifier comprises a multi-segment, multi-color identifier.

17. The system as in claim 16 wherein said multi-segment, multi color identifier has an inherent orientation.

18. The system as in claim 13 and also comprising a storage unit to store said at least partial image and its associated identification and location codes.

19. The system as in claim 13 and wherein said imager is a color imager.

20. The system as in claim 13 wherein said at least one imagable identifier comprises a plurality of imagable identifiers arranged in at least predetermined propinquity to each other.

21. The system as in claim 13 wherein said identifier has an inherent orientation.

22. A computer-readable medium having computer-executable instructions for performing a methodology for tracking a multiplicity of objects at a known location, each of which has at least one imagable identifier affixed thereto, comprising: imaging together at said known location said multiplicity of objects to provide an at least partial image of said multiplicity of objects, said image including said imagable identifier on each of said multiplicity of said objects; employing said at least partial image to determine an identification code for at least a plurality of said multiplicity of objects; and associating each identification code with a known location code.

23. The computer-readable medium as in claim 22 further comprising communicating said at least partial image and its associated identification and location codes to a remote location.

24. The computer-readable medium as in claim 22 wherein said at least one imagable identifier comprises a multi-color identifier.

25. The computer-readable medium as in claim 22 wherein said at least one imagable identifier comprises a multi-segment, multi-color identifier.

26. The computer-readable medium as in claim 25 wherein said multi-segment, multi-color identifier has an inherent orientation.

27. The computer-readable medium as in claim 22 wherein said imaging comprises sequentially imaging a plurality of said objects passing a given imaging location.

28. The computer-readable medium as in claim 22 wherein said at least one imagable identifier comprises a plurality of imagable identifiers arranged in at least predetermined propinquity to each other.

29. The computer-readable medium as in claim 22 and also comprising storing said at least partial image and its associated identification and location codes.

30. The computer-readable medium as in claim 22 and wherein said imaging is color imaging.

31. The computer-readable medium as in claim 22 wherein said identifier has an inherent orientation.

32. A methodology far tracking objects comprising: receiving a first multiplicity of objects to be tracked at a first known location, each of said first multiplicity of objects having at least one imagable identifier affixed thereto; imaging said first multiplicity of objects together at said first known location to provide a first at least partial image of said first multiplicity of objects; employing said first at least partial image to determine a first set of identification codes, one for each at least a plurality of said first multiplicity of objects; associating each of said identification codes of said first set of identification codes with a first known location code; receiving a second multiplicity of objects to be tracked at a second known location, each of said second multiplicity of objects having at least one imagable identifier affixed thereto; imaging said second multiplicity of objects together at said second known location to provide a second at least partial image of said second multiplicity of objects; employing said second at least partial image to determine a second set of identification codes, one for each of at least a plurality of said second multiplicity of objects; and; associating each of said identification codes of said second set of identification codes with a second known location code.

33. The methodology as in claim 32 wherein said imaging of said first multiplicity of objects and said imaging of said second multiplicity of objects occur at different times.

34. The methodology as in claim 32 wherein an object in said first multiplicity of objects is also in said second multiplicity of objects and said associated identification and location codes with respect to said object are first stored and then updated.

35. The methodology as in claim 32 further comprising communicating at least one of said first or second at least partial image and its associated said identification and location codes to a remote location.

36. The methodology as in claim 32 wherein said at least one imagable identifier comprises a multi-color identifier.

37. The methodology as in claim 32 wherein said at least one imagable identifier comprises a multi-segment, multi-color identifier.

38. The methodology as in claim 32 wherein said multi-segment, multi-color identifier has an inherent orientation.

39. The methodology as in claim 32 wherein said first and second imaging comprises sequentially imaging a plurality of said objects passing a given imaging location.

40. The methodology as in claim 32 wherein said at least one imagable identifier comprises a plurality of imagable identifiers arranged in at least predetermined propinquity to each other.

41. The methodology as in claim 32 and wherein said imaging is color imaging.

* * * * *